United States Patent
Suganuma

(10) Patent No.: US 7,230,762 B1
(45) Date of Patent: Jun. 12, 2007

(54) POLARIZATION PHASE DIFFERENCE PLATE

(75) Inventor: Takayoshi Suganuma, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/361,639

(22) Filed: Feb. 24, 2006

(30) Foreign Application Priority Data

Dec. 28, 2005 (JP) .............................. 2005-378339

(51) Int. Cl.
*G02B 5/18* (2006.01)
(52) U.S. Cl. ...................... 359/569; 359/566; 359/574; 359/485; 359/494
(58) Field of Classification Search ................ 359/569, 359/494, 485, 566, 574
See application file for complete search history.

(56) References Cited

U.S. PATENT DOCUMENTS 6,243,199 B1 * 6/2001 Hansen et al. .............. 359/486

FOREIGN PATENT DOCUMENTS

JP        2005-044429      *  2/2006

* cited by examiner

*Primary Examiner*—Leonidas Boutsikaris
(74) *Attorney, Agent, or Firm*—Koda & Androlia

(57) ABSTRACT

The object of the present invention is to provide an excellent-quality polarization phase difference plate that enables, by a simple structure: decrease in light loss and in oscillation of the intensity of the transmitting emission light through effectively suppressing Fresnel reflection in the polarization phase difference plate; improvements in the optical property, cut in the cost; and decrease in the manufacture inferior. In the polarization phase difference plate, cross-sectional shape of the convex part is formed in a taper shape from the bottom part thereof towards the top part; a flat part is formed at least between the convex parts being adjacent to each other; and the period of the diffraction grating is formed in a size that is equal to or smaller than the wavelength of light to be used.

6 Claims, 16 Drawing Sheets

POLARIZATION PHASE DIFFERENCE PLATE

BACKGROUND OF THE INVENTION

1. Field of the Invention

The present invention relates to a polarization phase difference plate and, particularly, to a polarization phase difference plate utilizing structural birefringence caused due to the fine structure.

2. Description of the Related Art

The polarization phase difference plate enables conversion of polarization state of incident light by birefringence. As such polarization phase difference plate, $\lambda/4$ plates, $\lambda/2$ plates and the like are well known.

The polarization phase difference plates can be roughly classified into following three types.

The first type is a polarization phase difference plate formed by stretching an optical polymer film that is optically uniaxial in such a manner that a total amount of birefringence (described in detail later) for the wavelength $\lambda$ of the light to be used becomes $\lambda/4$ (90°) or $\lambda/2$ (180°).

The second type is a polarization phase difference plate formed in such a manner that a total amount of birefringence for the wavelength $\lambda$ of the light to be used becomes $\lambda/4$ (90°), by adjusting the film thickness through optically polishing uniaxial crystals such as quartz crystals.

The third type is a polarization phase difference plate that utilizes structural birefringence generated due to the fine periodic structure.

All of those three types of polarization phase difference plates are used as elements for converting polarized light.

Specifically, those are used to convert linearly polarized light into circularly polarized light by directing the light of the linear polarization in the direction at 45° with respect to the fast axis (advance phase axis) or the slow axis (delay phase axis) of the polarization phase difference plate. Inversely, those are used to convert the circularly polarized light into the linearly polarized light by directing the circular polarization towards the polarization phase difference plate.

The aforementioned structural birefringence will now be described in detail. The structural birefringence is known as a phenomenon where birefringence is generated from an anisotropic-shaped one-dimensional periodic structure in a region about a half the wavelength of the light or smaller.

As an example of such structural birefringence, let us look into the case where, as shown in FIG. 1, for example, there periodically exist two kinds of media, i.e. a medium (an air layer) having permittivity $\epsilon_1$ and a medium (convex part 2 of diffraction grating 1) having permittivity $\epsilon_2$ particularly in a minute-size region with only zero-order diffraction gratings present, and light makes incidence in the z-axis direction (in the longitudinal direction of FIG. 1).

It is known in this case that average permittivity in the x-axis direction (in the lateral direction of FIG. 1) and in the z-axis direction can be expressed by following expressions based on ideas of an effective refractometry.

$$\epsilon_\parallel^{(0)} = (1-f)\cdot\epsilon_1 + f\cdot\epsilon_2 \text{ (filling factor } f=w/\Lambda) \quad (1\text{-}1)$$

$$1/\epsilon_\perp^{(0)} = (1-f)/\epsilon_1 + f/\epsilon_2 \quad (1\text{-}2)$$

Each of expressions (1-1) and (1-2) is applicable on the assumption that the media spread infinitely in the x-axis and y-axis directions. Further, each expression applies approximately on the assumption that the periods $\Lambda$ of each medium with the permittivity of $\epsilon_1$, $\epsilon_2$ (see FIG. 1) are much smaller than the wavelength of the light. f in the expression (1-1) is a parameter called the filling factor, which is expressed as $w/\Lambda$, the ratio of the size of the medium (convex part 2) with the permittivity $\epsilon_2$ in the x-axis direction with respect to the period $\Lambda$.

The square of diffractive index n is the permittivity $\epsilon$. Further, birefringence amount $\Delta n$, i.e. the amount of the birefringence generated per unit height of the polarization phase difference plate (in other words, the polarization phase difference amount) is proportional to the amount of $\epsilon_\parallel^{(0)} - \epsilon_\perp^{(0)}$ in the above-described expressions. Further, the amount of birefringence generated in the entire polarization phase difference plate, i.e. the total amount of birefringence, is roughly proportional to the depth d of the diffraction grating 1 (in other words, the height of the convex part 2).

As can be seen from each of the expressions (1-1), (1-2), use of uniaxial medium that utilizes the structural birefringence provides such an advantage that the birefringence amount $\Delta n$ and, moreover, the total amount of the birefringence can be controlled artificially by changing the value of the filling factor f of the periodic structure of the diffraction grating.

Regarding this, there is described in detail in Optical Review vol. 2 (1995) pp. 92–99. It is known that precise birefringence amount $\Delta n$ and total amount of the birefringence can be calculated almost accurately by RCWA method (Rigorous Coupled Wave Analysis) that is one of the rigorous electromagnetic analyzing methods.

In order to minimize the loss of light in the polarization phase difference plate having such structural birefringence, it is necessary for the period $\Lambda$ to be in such a size that high-order diffraction light is not generated.

As an expression of a condition for not generating the light of first order or higher, the following expression (2) needs to be satisfied.

$$(\Lambda/\lambda) < 1/(\max[n_s, n_i] + n_i \cdot \sin\theta_{max}) \quad (2)$$

where, $\Lambda$ is a period of the diffraction grating that constitutes the polarization phase difference plate, $\lambda$ is the wavelength of the light to be used, and $\theta$ is an incident angle of the light with respect to the polarization phase difference plate. Furthermore, in the expression (2), ns is the diffractive index of the base material that constitutes the polarization phase difference plate, and ni is the diffractive index of the medium (air) on the incident side.

Assuming that the wavelength of the light to be used is 650 nm, the diffractive index is 1.512, and the incident angle is 0°, the period $\Lambda$ becomes smaller than 0.429 μm.

That is, it is found that the period needs to be smaller than 429 nm in order to form the polarization phase difference plate with less light loss.

There have been proposed various kinds of polarization phase difference plates so far, which utilize such type of structural birefringence.

For example, Patent Literature 1 discloses, as a polarization phase difference plate, a wave plate 4 utilizing a lamellar-shape diffraction grating 1 of a sub-wavelength region as shown in FIG. 2.

[Patent Literature 1] Japanese Patent Unexamined Publication 2003-207636

[Patent Literature 2] Japanese Patent Unexamined Publication 2005-99099

[Patent Literature 3] Japanese Patent Unexamined Publication 2005-44429

However, there are problems in the conventional polarization phase difference plate in terms of its optical properties or manufacture as described below.

That is, conventionally, Fresnel reflection is caused on the surface of the polarization phase difference plate in the thickness direction due to a difference between the diffractive index of the diffraction grating constituting the polarization phase difference plate and the diffractive index of the air layer. This Fresnel reflection increases the power loss of the transmission light that transmits the polarization phase difference plate.

Furthermore, conventionally, interference (Fabry-Perot multiple interference) is generated between the Fresnel reflection on the surface of the polarization phase difference plate in the thickness direction and the Fresnel reflection on the other surface of the polarization phase difference plate in the thickness direction. Therefore, particularly in the case where the light to be used is light with high interference such as laser beams, the intensity of the transmitting emission light becomes oscillated, thus causing it to be unstable.

These problems are factors for deteriorating the quality of the polarization phase difference plate.

As a method for eliminating such Fresnel reflection, there is a method as disclosed in Patent Literature 2, for example, which perform coating of an antireflection layer made of a dielectric multilayer film on the surface of the polarization phase difference plate (wave plate in Patent Literature 2) using vacuum deposition or the like. In this case, the dielectric multilayer film can be formed by alternately laminating a high-diffractive layer and a low-diffractive layer such as $SiO_2$, $TiO_2$.

However, when employing such antireflection film, there is required a device for coating the antireflection film in vacuum. Thus, it is disadvantageous in terms of the cost.

Furthermore, many of the cases use an inorganic substance such as oxide for the dielectric multilayer film so that, particularly when the polarization phase difference plate is of high polymer, adhesion between the antireflection coating and the polarization phase difference plate tends to be weak. In addition, due to a difference between the thermal expansion coefficients, there may cause manufacture inferior such as separation of the antireflection film, cracks, etc.

In the art disclosed in Patent Literature 3, the top end of the fine periodic structure is formed in a taper shape for reducing Fresnel reflection on the surface of the wave plate. However, there is no mention of parameters for specifying the taper shape and taper angle which are effective for reducing the Fresnel reflection. Further, the wavelength band that is effective for antireflection is not mentioned either.

SUMMARY OF THE INVENTION

The present invention has been designed in view of the aforementioned problems. The object of the present invention therefore is to provide an excellent-quality polarization phase difference plate that enables, by a simple structure: decrease in the light loss and in oscillation of the intensity of the transmitting emission light through effectively suppressing Fresnel reflection in the polarization phase difference plate; improvements in the optical property; cut in the cost; and decrease in the manufacture inferior.

In order to achieve the foregoing object, a polarization phase difference plate according to a first aspect of the present invention comprises: a diffraction grating with a constant period having a plurality of convex parts being arranged, which is formed at least on one of surfaces of a substrate in a thickness direction, and the polarization phase difference plate is formed to be capable of utilizing structural birefringence of the diffraction grating, wherein: cross-sectional shape of the convex part is formed in a taper shape from the bottom part thereof towards the top part; a flat part is formed at least between the convex parts being adjacent to each other; and the period of the diffraction grating is formed in a size that is equal to or smaller than a wavelength of the light to be used.

With the first aspect of the present invention, Fresnel reflection can be effectively suppressed without coating an antireflection film through: forming the cross-sectional shape of the convex part of the diffraction grating in a taper shape from the bottom part towards the top part; forming the flat part at least between the convex parts, and setting the period of the diffraction grating to be equal to or less than the wavelength of the light to be used (referred to as the used wavelength hereinafter).

A polarization phase difference plate according to a second aspect of the present invention is the polarization phase difference plate of the first aspect, wherein: the substrate and the diffraction grating are formed by a same substance; and the period of the diffraction grating is formed in a size that is two thirds of the wavelength of the light to be used or smaller.

In the second aspect of the present invention, further, the substrate and the diffraction grating are formed by the same substance. Thus, it is possible to cut the cost and improve the mass-productivity. Furthermore, the period of the diffraction grating is set as two thirds the used wavelength or smaller, so that Fresnel reflection can be suppressed more effectively.

A polarization phase difference plate according to a third aspect is the polarization phase difference plate of the first aspect, wherein the bottom part of the convex part in a period direction of the diffraction grating is formed to have a dimension that is 0.7–0.8 times the period of the diffraction grating.

In the third aspect of the present invention, further, the dimension of the convex part is specified. Thus, Fresnel reflection can be suppressed more effectively.

A polarization phase difference plate according to a fourth aspect is the polarization phase difference plate according to the first aspect, wherein the cross-sectional shape of the convex part is formed in a triangular shape.

With the fourth aspect of the present invention, Fresnel reflection can be suppressed more effectively by forming the cross-sectional shape of the convex part in a triangular shape.

A polarization phase difference plate according to a fifth aspect is the polarization phase difference plate according to the first aspect, wherein: the substrate and the diffraction grating are formed by a resin material; and the period of the diffraction grating is formed in 400 nm.

In the fifth aspect of the present invention, the substrate and the grating can be formed at a low cost by the same resin material. Further, the period of the diffraction grating is specified so that Fresnel reflection can be suppressed more effectively.

A polarization phase difference plate according to a sixth aspect is the polarization phase difference plate according to any one of the first to fifth aspects, wherein the diffraction grating is formed on both surfaces of the substrate in a thickness direction.

With the sixth aspect of the present invention, it is possible to form the polarization phase difference plate with a desired optical property more easily by forming the diffraction grating on both surfaces of the substrate in a thickness direction.

A polarization phase difference plate according to a seventh aspect is the polarization phase difference plate according to the sixth aspect, wherein a total amount of birefringence for each of the two diffraction gratings formed on the both surfaces of the substrate in the thickness direction is set as λ/8 (45°) for the light with a wavelength of λ, respectively, so that the polarization phase difference plate functions as a λ/4 plate as a whole.

In the seventh aspect of the present invention, the total amounts of birefringence of the two diffraction gratins are specified. Thus, the λ/4 plate with an excellent optical property can be formed easily.

With the polarization phase difference plate according to the present invention, it is possible by a simple structure having no antireflection film to reduce loss of light and oscillation in the intensity of the transmitting emission light by effectively suppressing Fresnel reflection in the polarization phase difference plate. Therefore, it allows improvements in the optical property, cut in the cost, and decrease in the manufacture inferior.

DETAILED DESCRIPTION OF THE PREFERRED EMBODIMENT

Embodiments of the polarization phase difference plate according to the present invention will be described hereinafter by referring to FIG. 3–FIG. 16.

Figure 3:
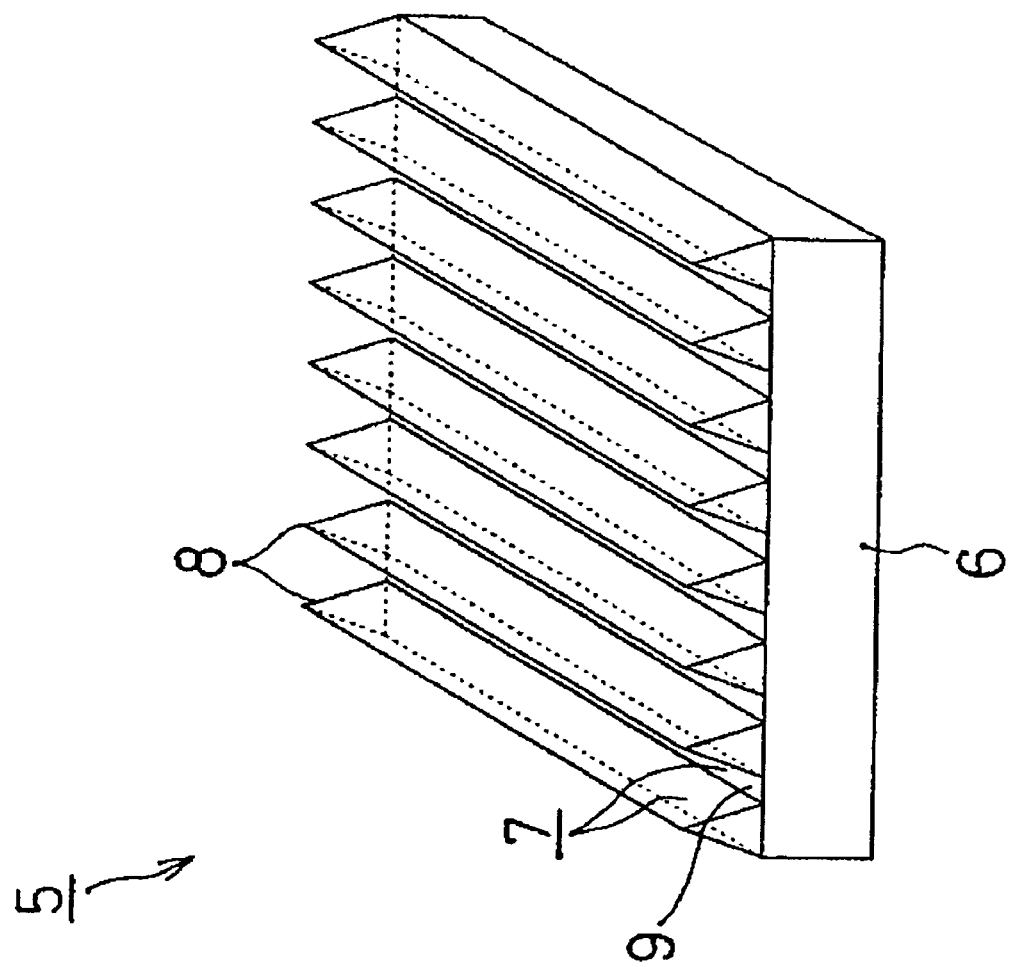
FIG. 3 is a perspective view for showing an embodiment of a polarization phase difference plate according to the present invention.
Figure 4:
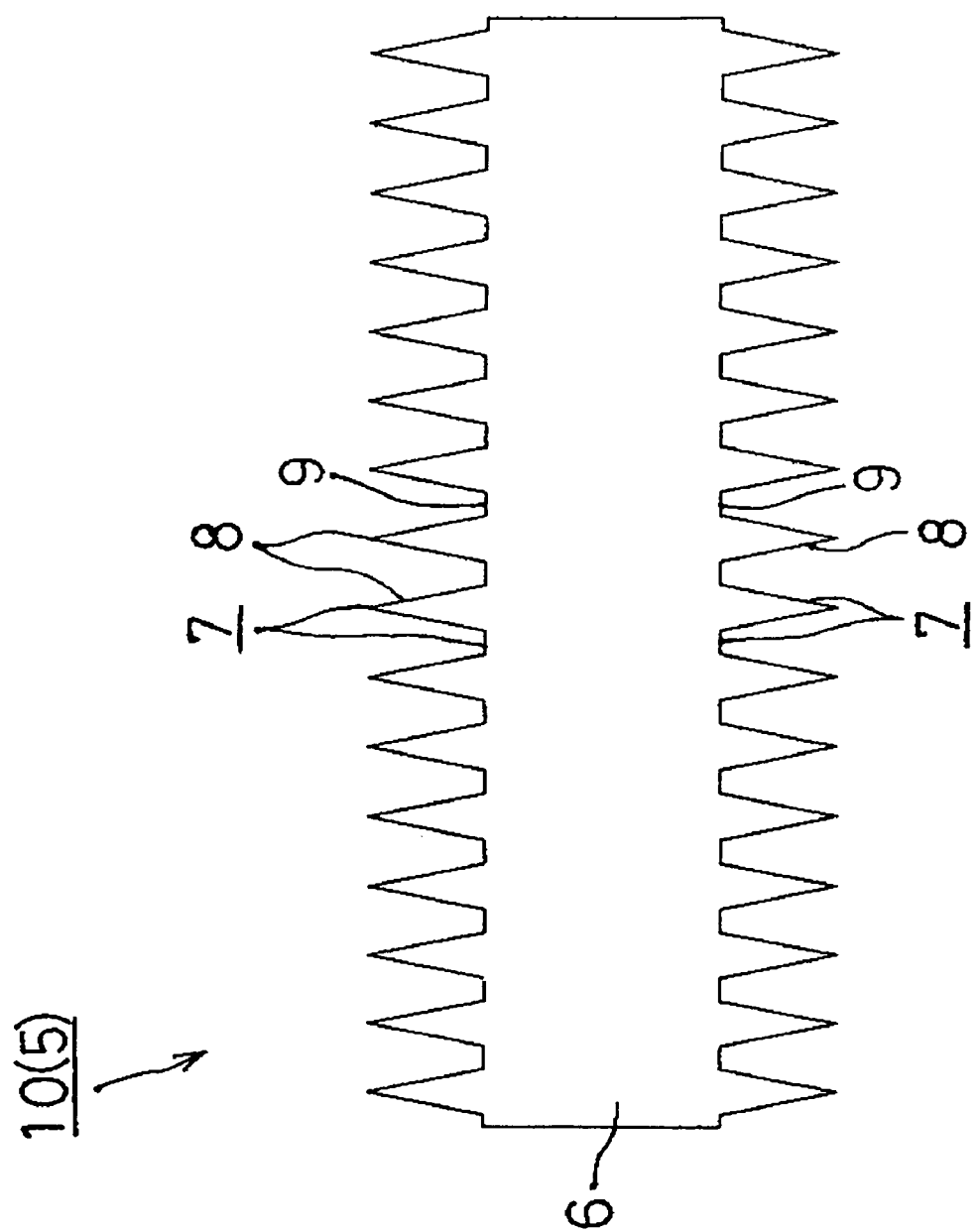
FIG. 4 is a front elevational view for showing a λ/4 plate in the embodiment of the polarization phase difference plate according to the present invention.

As shown in FIG. 3, a polarization phase difference plate 5 comprises a substrate 6 with a prescribed thickness. On one of the surfaces of the substrate 6 in the thickness direction, there is formed a diffraction grating 7 with a constant period Λ (see FIG. 6), in which a plurality of convex parts 8 are arranged.

Further, the cross-sectional shape of the convex part is formed in a taper shape from the bottom part towards the top part.

Furthermore, there is formed a flat part 9 between the adjacent convex parts 8, which is formed by exposing the surface of the substrate 6.

Moreover, the period Λ of the diffraction grating 7 is formed in a size (sub-wavelength) that is equal to or smaller than the wavelength in use.

The substrate 6 and the diffraction grating 7 are formed integrally through a method such as embossing using a molding die or nano-imprinting by using the same resin material. Examples of the resin material to be used are thermoplastic resins such as polyolefin base material, acryl base material, and polycarbonate. It is preferable for the resin material to have less absorption of visible light and more preferable to exhibit the diffractive index of about 1.50–1.52 in the wavelength region of the visible light.

Now, let us look into the case where a λ/4 plate 10 is produced as the polarization phase difference plate 5 by forming two diffraction gratings 7 functioning as λ/8 plates on each of both surfaces of the substrate 6 in the thickness direction.

In this case, the preferable shape and dimension of the polarization phase difference plate 5 for easily manufacturing the λ/4 plate 10 with excellent optical property are obtained in the following manner.

The preferable shape and dimension of the polarization phase difference plate 5 can be determined by referring to FIG. 5–FIG. 8 and Table 1 shown in the followings based on whether or not it exhibits low light reflectance for the wavelength to be used and is in an easily formable shape.

Figure 5:
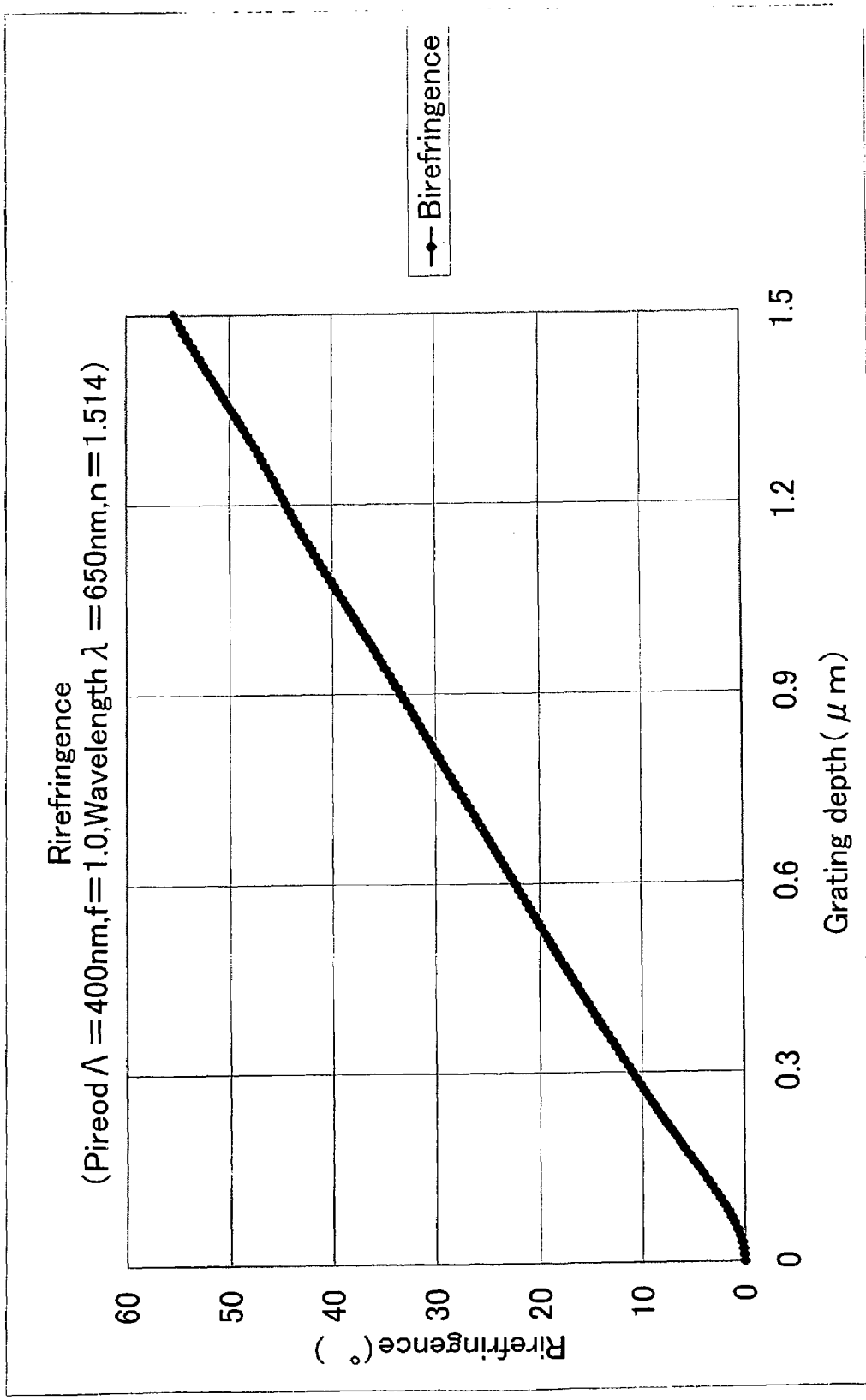
FIG. 5 is a graph for showing the relation between the grating depth and the total amount of the birefringence in the embodiment of the polarization phase difference plate according to the present invention.
Figure 6:
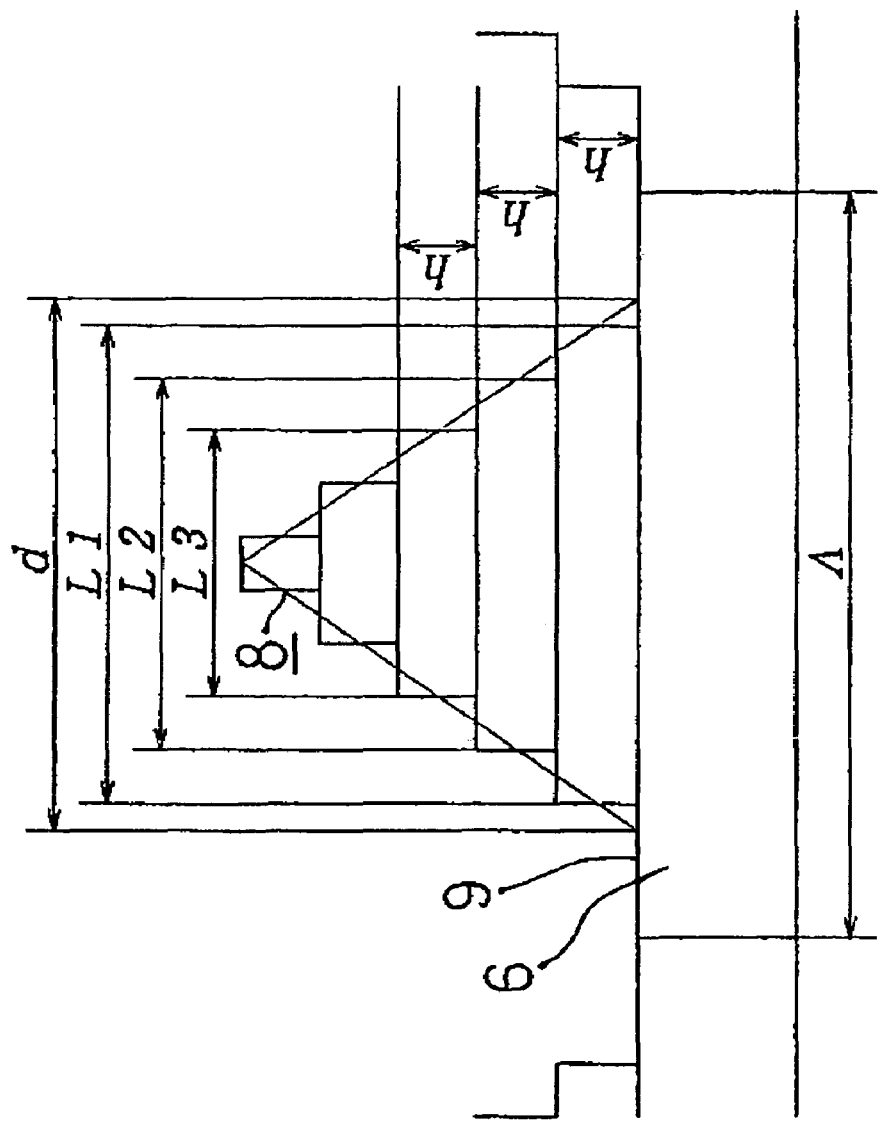
FIG. 6 is an illustration for describing the approximate shape of the convex part when calculating the total amount of the birefringence of the diffraction grating in the embodiment of the polarization phase difference plate according to the present invention.

FIG. 5 shows the relation between the grating depth (height of the convex part 8) of the diffraction grating 7 and the total amount of the birefringence (birefringence (°) of FIG. 5) when the used wavelength λ is 650 nm and the filling factor f is 1.0. The filling factor f in FIG. 5 is defined as f=d/Λ, which is the ratio of the dimension (width dimension) of the bottom part of the convex part 8 in the direction of the period of the diffraction grating 7 with respect to the period Λ of the diffraction grating 7 as shown in FIG. 6. Further, the total amount of the birefringence shown in FIG. 5 is calculated by using the aforementioned RCWA method.

When calculating the total amount of the birefringence using the RCWA method, as shown in FIG. 6, the taper shape of the convex part 8 is approximated in each step of five-stage steps. Also, the parameter for the height of each step is defined as h in addition to the above-described Λ and d. Further, it is assumed that the straight line of the taper goes through the middle point of each step in the respective height direction. Furthermore, the width dimensions of the bottom part in each step of the five stages are defined as L1–L5 in order from the lowest step, and the width dimensions of each step are defined as coordinates shown below. The total amount of the birefringence is calculated on those conditions.

$L1(\lambda/2-9d/20, \lambda/2+9d/20)$ $L2(\lambda/2-7d/20, \lambda/2+7d/20)$ $L3(\lambda/2-5d/20, \lambda/2+5d/20)$ $L4(\lambda/2-3d/20, \lambda/2+3d/20)$ $L5(\lambda/2-d/20, \lambda/2+d/20)$ Further, as described above, the period Λ of the diffraction grating 7 is necessary to be 429 nm or less. Thus, in this calculation, the total amount of the birefringence is calculated with the period Λ of 400 nm, considering the precision errors and the like that may be generated at the time of manufacture. The period Λ=400 nm is the size that is smaller than two thirds of the used wavelength 650 nm.

Figure 7:
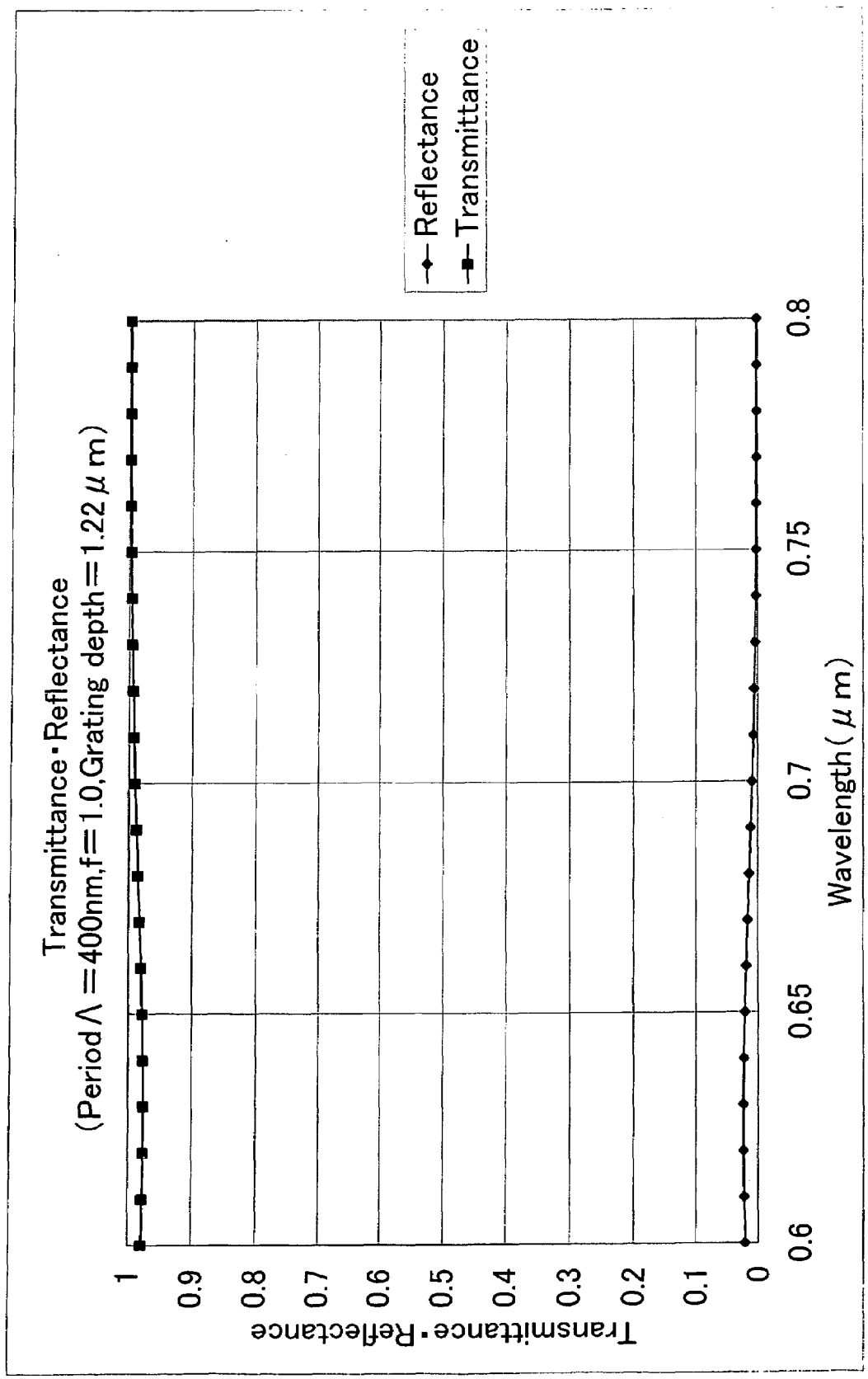
FIG. 7 is a graph for showing the wavelength dependency of the transmittance/reflectance in the case where the diffraction grating functions as a λ/8 plate in the embodiment of the polarization phase difference plate according to the present invention.

FIG. 7 shows the wavelength dependency of the transmittance/reflectance of the diffraction grating 7 at the grating depth (1.22 μm) where the total amount of the birefringence becomes λ/8 (45°) in FIG. 5. It is found from FIG. 5 and FIG. 7 that the diffraction grating 7 functions as the λ/8 plate for the light with used wavelength λ of 650 nm when f=0 and the grating depth 5h=1.22 μm, and that the reflectance for the used wavelength is 2.2%.

Figure 8:
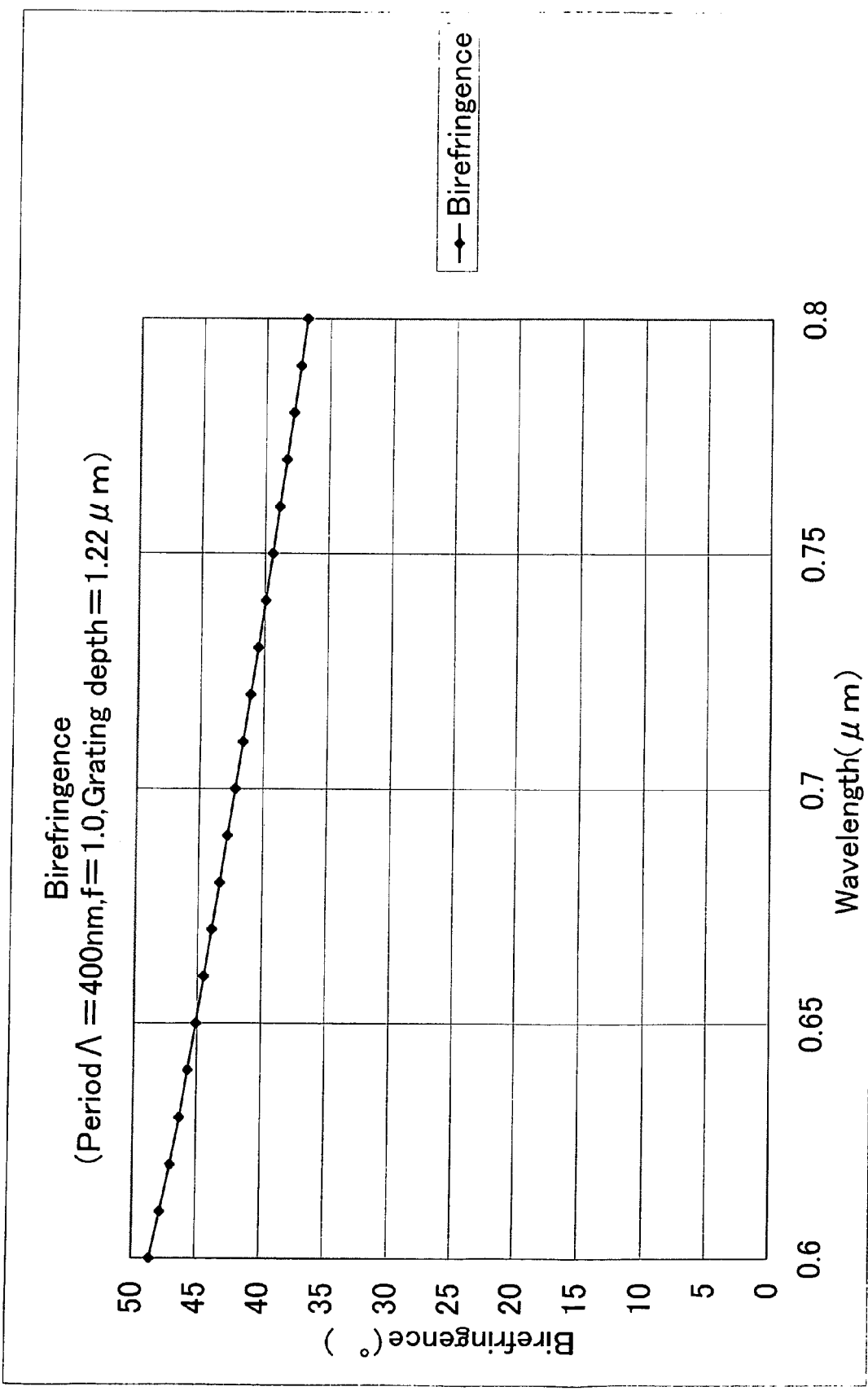
FIG. 8 is a graph for showing the relation between the total amount of birefringence and the wavelength under the same conditions as those of FIG. 7.

FIG. 8 shows the relation between the wavelength and the total amount of the birefringence under the same conditions as those of FIG. 7.

Similarly, the grating depths and the reflectance when the diffraction grating 7 functioned as the λ/8 plate was calculated by the RCWA method by changing the filling factor f of the diffraction grating 7 from 1.0 to 0.35 when λ=650 nm. Following table 1 shows the result.

TABLE 1

(Used wavelength λ = 650 nm)

| Filling factor f | Grating depth 5 h (μm) | Reflectance (%) |
| --- | --- | --- |
| 1.0 | 1.22 | 2.2 |
| 0.95 | 1.17 | 1.44 |
| 0.90 | 1.13 | 0.77 |
| 0.85 | 1.10 | 0.41 |
| 0.80 | 1.07 | 0.26 |
| 0.75 | 1.05 | 0.27 |
| 0.70 | 1.04 | 0.35 |
| 0.65 | 1.03 | 0.44 |
| 0.60 | 1.03 | 0.55 |
| 0.55 | 1.05 | 0.68 |
| 0.50 | 1.07 | 0.84 |
| 0.45 | 1.12 | 1.01 |

TABLE 1-continued (Used wavelength λ = 650 nm)

| Filling factor f | Grating depth 5 h (μm) | Reflectance (%) |
| --- | --- | --- |
| 0.40 | 1.18 | 1.22 |
| 0.35 | 1.29 | 1.95 |

Figure 1:
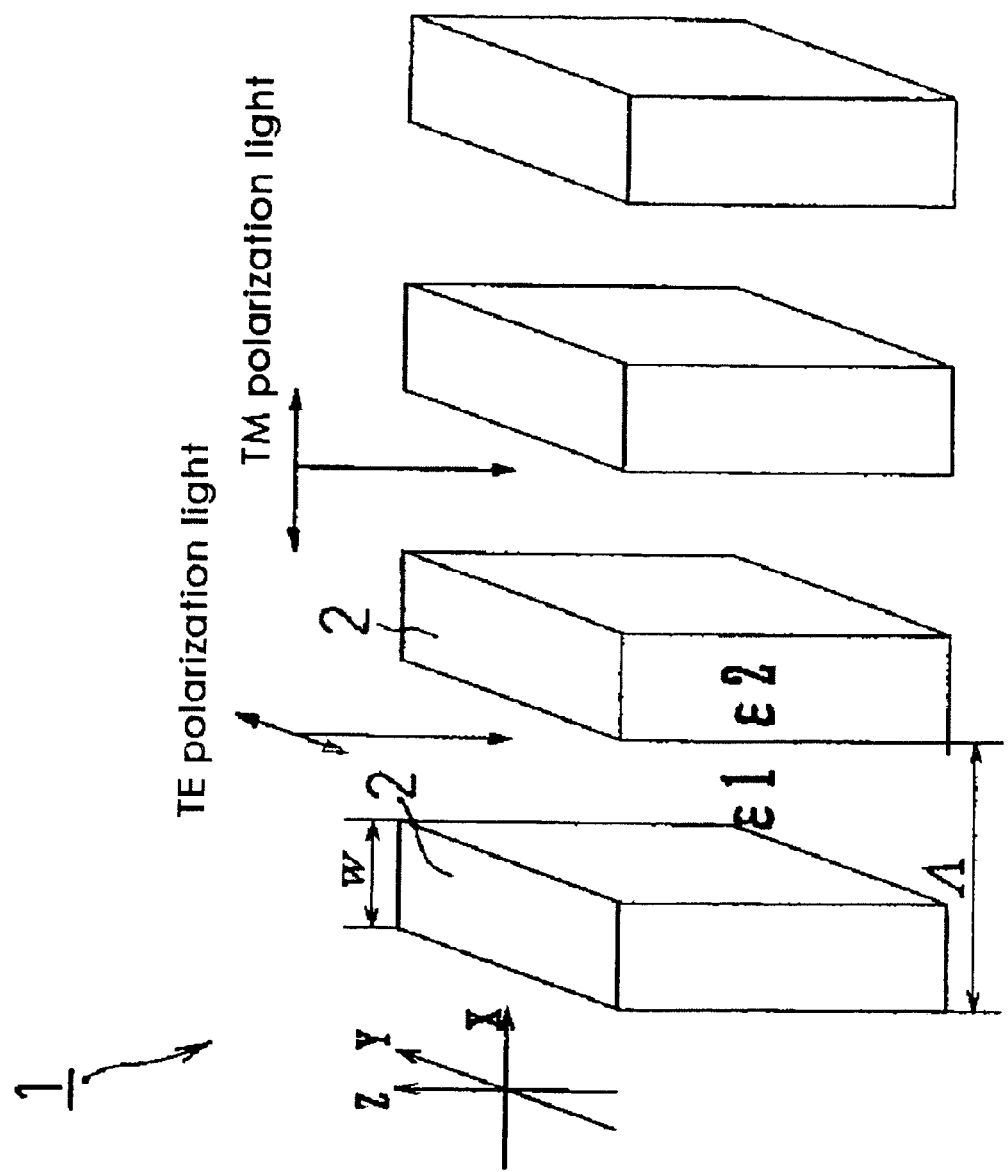
FIG. 1 is a perspective view for schematically showing the structure of a diffraction grating used in a conventional polarization phase difference plate.
Figure 2:
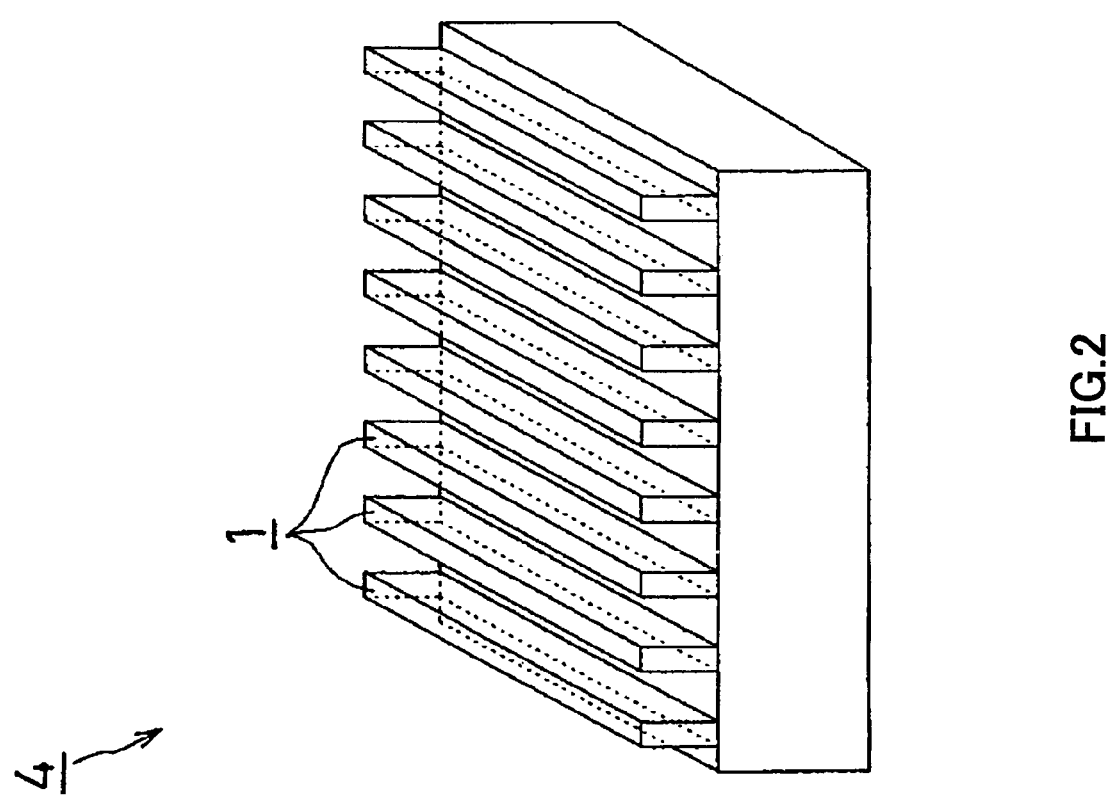
FIG. 2 is a perspective view for showing the entire structure of the conventional polarization phase difference plate.
Figure 9:
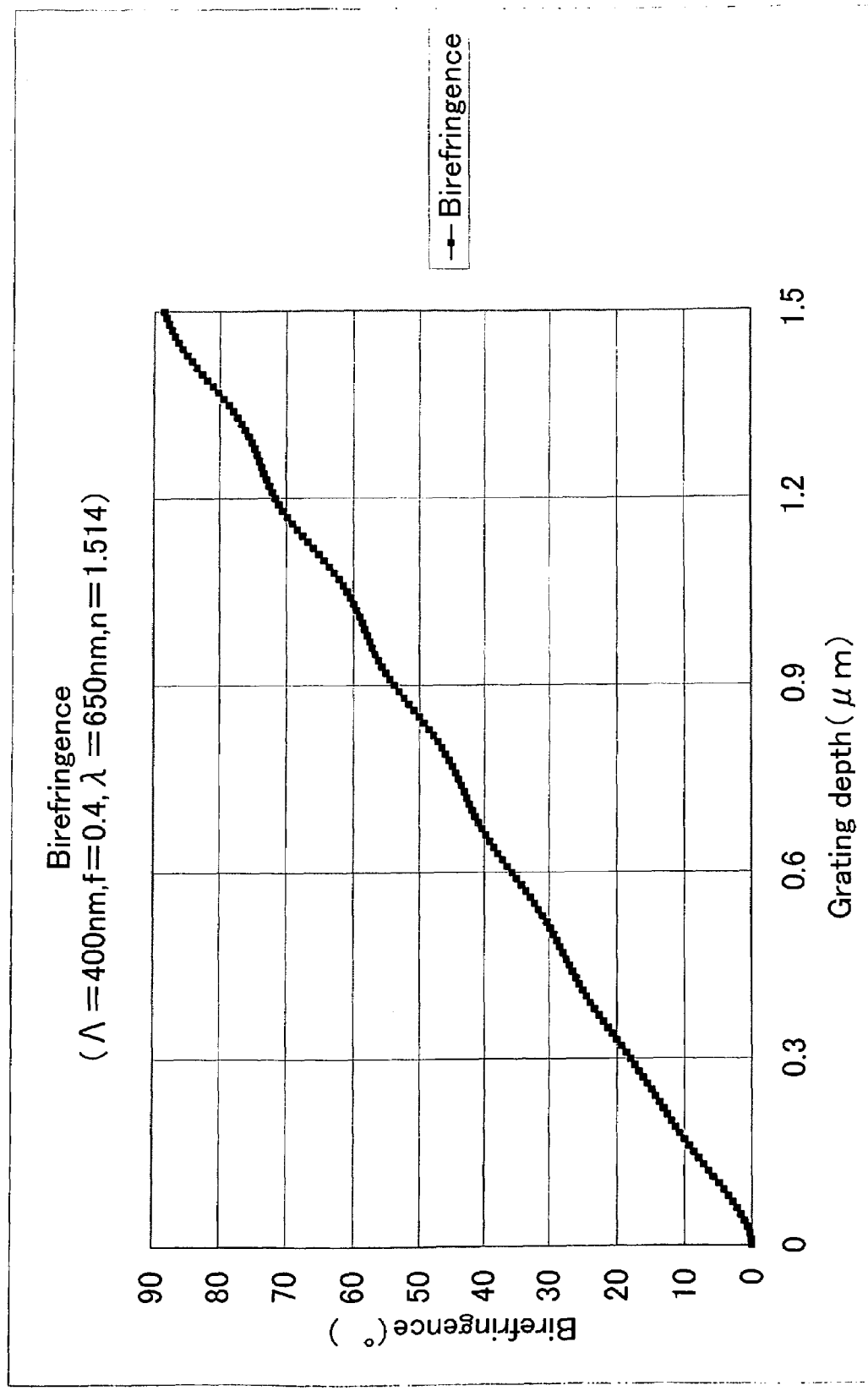
FIG. 9 is a graph for showing the relation between the grating depth and the total amount of the birefringence in the conventional polarization phase difference plate.
Figure 10:
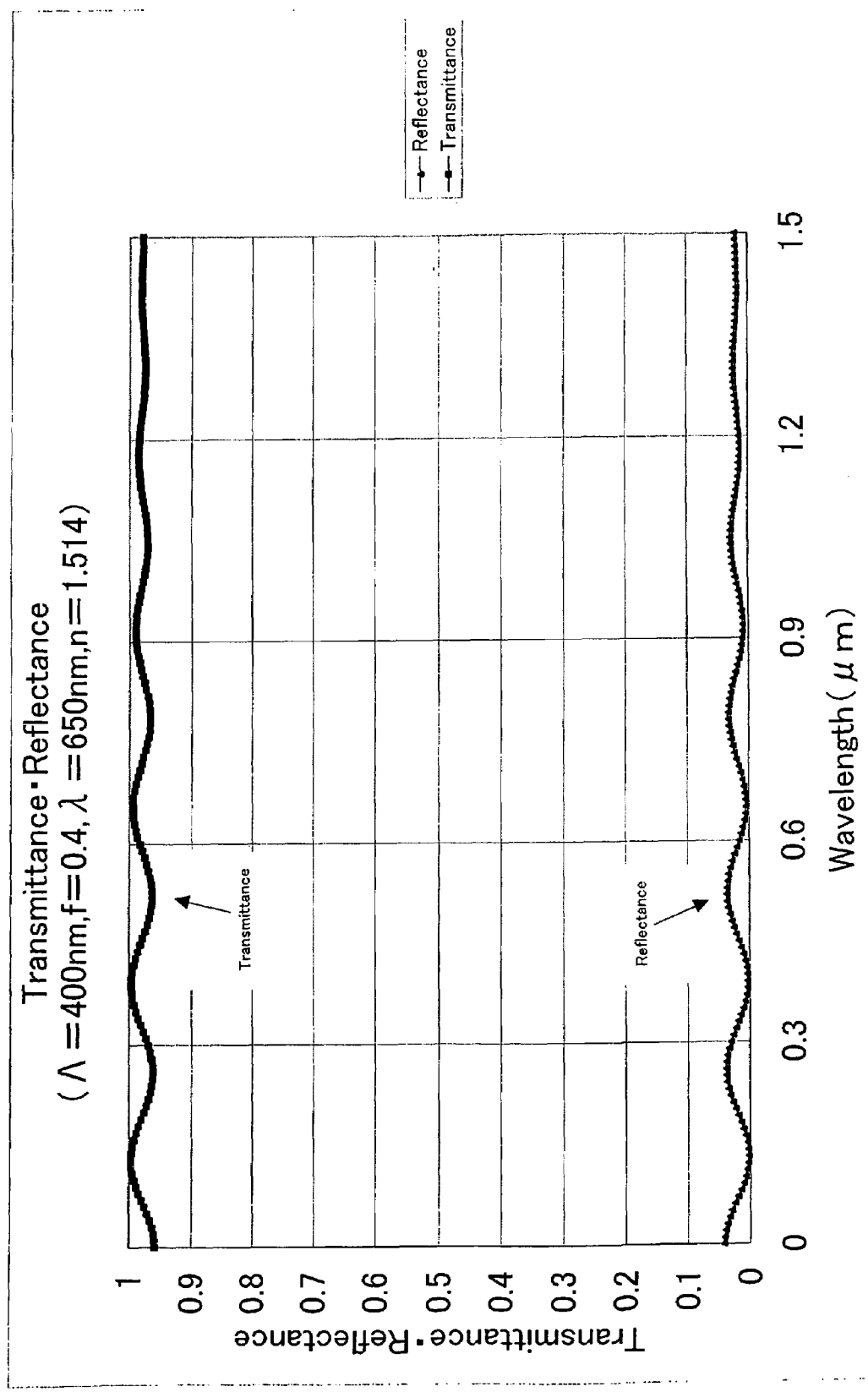
FIG. 10 is a graph for showing the wavelength dependency of the transmittance/reflectance in the conventional polarization phase difference plate.

FIG. 9 corresponds to FIG. 5, which shows the case where the diffraction grating 1 is in a regular lamellar (rectangular) shape as shown in FIG. 2. FIG. 10 shows the wavelength dependency of the transmittance/reflectance of the diffraction grating 1 when the diffraction grating 1 becomes the grating depth (5h=0.78 μm) in FIG. 9 to function as the λ/8 plate. In FIG. 10, the reflectance for the used wavelength λ of 650 nm is 3.21%.

Comparing this to the reflectance shown in Table 1, it is found that the reflectance can be decreased compared to that in the case of the lamellar shape by forming the cross sectional shape of the convex part 8 of the diffracting grating 7 in a taper shape.

However, at the same time, it can be seen from Table 1 that a change in the filling factor f changes not only the grating depth by which the total amount of the birefringence becomes λ/8 (45°), but also the value of the reflectance. Thus, forming the convex part 8 of the diffraction grating in a taper shape is insufficient for decreasing the reflectance.

The reflectance becomes the minimum when the dimension of the flat part 9, which is formed between the convex parts 8, in the period direction (width dimension) of the diffraction grating 7 takes a specific value. The width dimension of the flat part 9 has a relation corresponding to the filling factor f of Table 1, so that the width dimension of the flat part 9 is unequivocally defined by defining the filling factor f.

However, in this embodiment, the grating depth 5h (height of the convex part 8) is desirable to be as shallow (low) as possible considering the easiness of being removed from a molding die because the polarization phase difference plate 5 is manufactured using the molding die.

When considering the two elements such as reduction of the reflectance and easiness of being removed from the molding die (easiness of manufacture), it is found that, when the used wavelength λ is 650 nm and Λ is 400 nm, the reflectance becomes low as the λ/8 plate and the grating depth becomes shallow when the filling factor f is 0.60–0.80 (preferably 0.70–0.80 times).

In this way, there are determined the shape and dimension of the polarization phase difference plate 5 that is preferable for easily manufacturing the λ/4 plate 10 with an excellent optical property.

Figure 11:
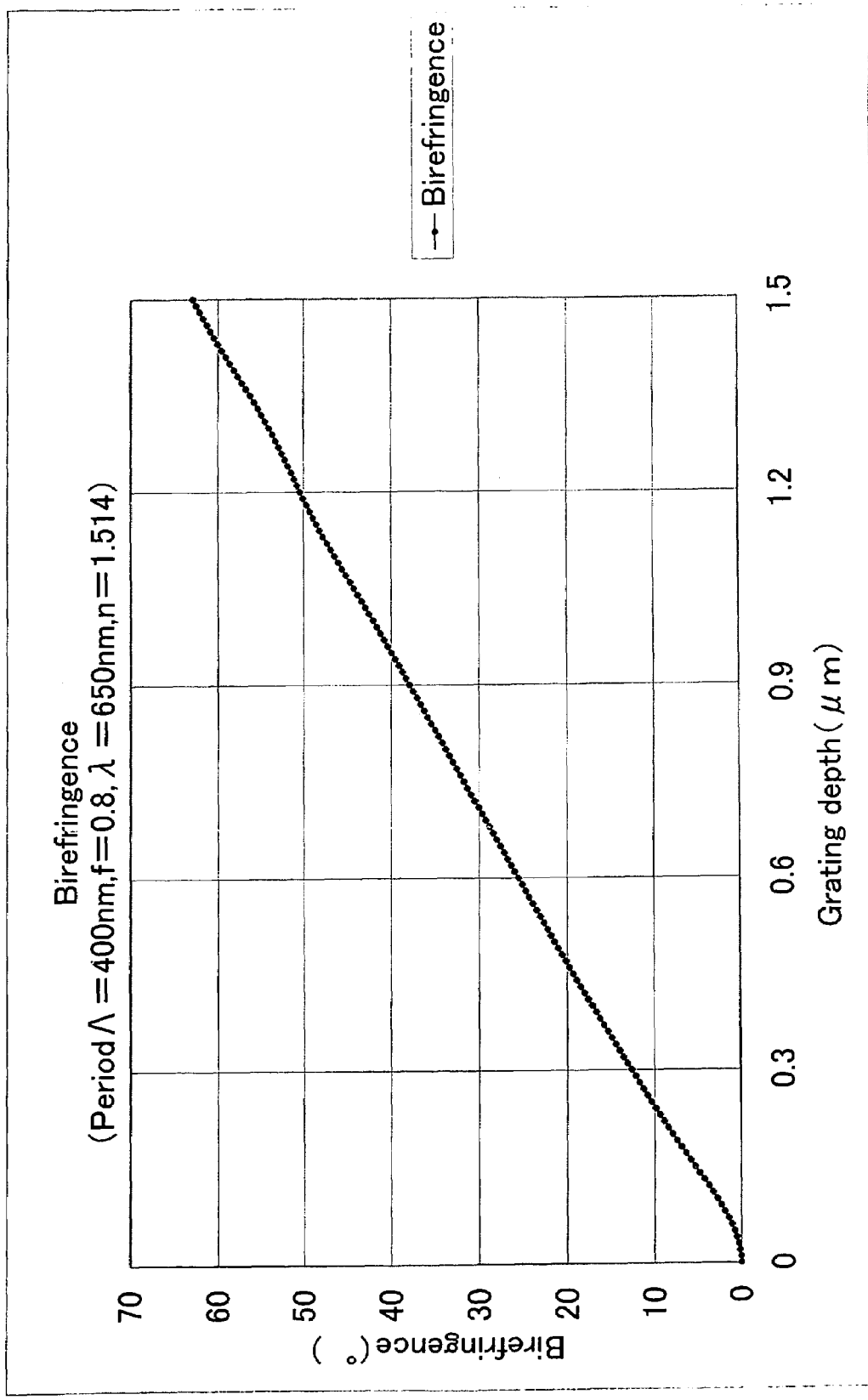
FIG. 11 is a graph for showing the relation between the grating depth and the total amount of the birefringence in the embodiment of the polarization phase difference plate according to the present invention, in which the filling factors are different from those of FIG. 5.
Figure 12:
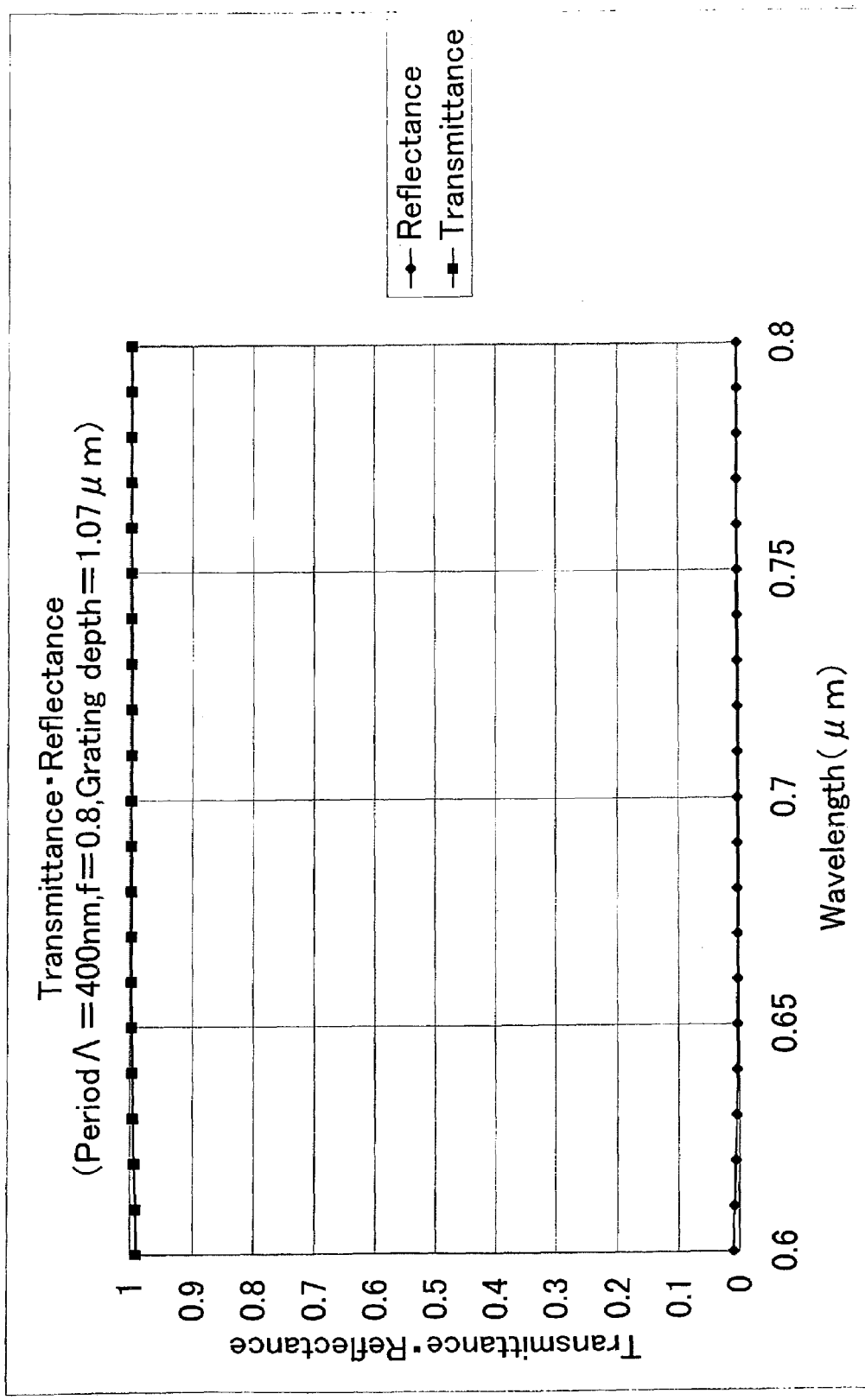
FIG. 12 is a graph for showing wavelength dependency of the transmittance/reflectance under the same conditions as those of FIG. 11.
Figure 13:
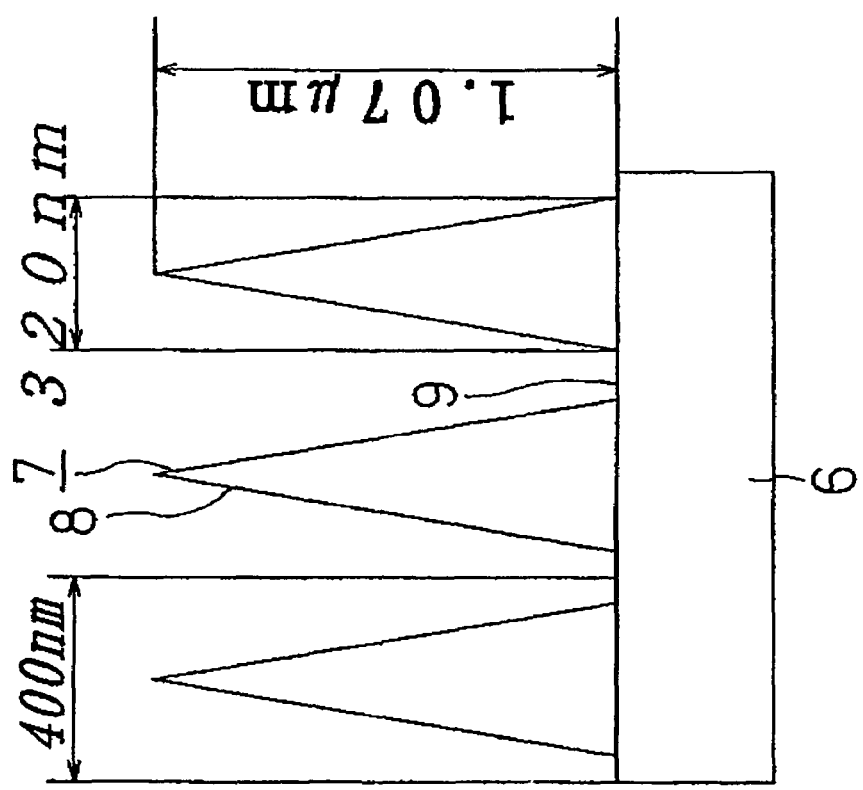
FIG. 13 is an illustration showing the structure of the diffraction grating of the case of FIG. 11 along with the specific dimension.

FIG. 11 shows the relation between the grating depth and the total amount of the birefringence when Λ=400 nm, the used wavelength λ=650 nm, and f=0.8. FIG. 12 shows the wavelength dependency of the transmittance/reflectance of the diffraction grating 7 in the grating depth (1.07 μm) where the total amount of the birefringence becomes 45° in FIG. 11. FIG. 13 is an example of the diffraction grating 7 in that state.

It has been already mentioned as the preferable shape and dimension of the polarization phase difference plate 5 that the filing rate f is preferable to be 0.60–0.80 when Λ=400 nm. This is the same as having the 240 nm–320 nm for the preferable width dimension of the bottom part of the convex part 8 of the diffraction grating 7 when Λ=400 nm.

Table 2 is similar to Table 1 only with the used wavelength λ of 780 nm.

The diffractive index of n=1.516 was employed for the 780 nm resin. Specifically, this value is the diffractive index of Zeonex-480R, a product of ZEON Corporation.

TABLE 2

(Used wavelength λ = 780 nm)

| Filling factor f | Grating depth 5 h (μm) | Reflectance (%) |
|---|---|---|
| 1.0 | 1.46 | 2.15 |
| 0.95 | 1.40 | 1.29 |
| 0.90 | 1.35 | 0.62 |
| 0.85 | 1.32 | 0.38 |
| 0.80 | 1.30 | 0.31 |
| 0.75 | 1.29 | 0.34 |
| 0.70 | 1.28 | 0.42 |
| 0.65 | 1.29 | 0.52 |
| 0.60 | 1.30 | 0.64 |
| 0.55 | 1.33 | 0.77 |
| 0.50 | 1.38 | 0.94 |
| 0.45 | 1.44 | 1.17 |
| 0.40 | 1.54 | 1.40 |
| 0.35 | 1.70 | 3.44 |

As clear from comparing Table 2 and Table 1, when the value of the filling factor f changes from 1–0.4, the grating depth where the total amount of the birefringence becomes λ/8 (45°) differ for each value depending on the wavelengths of the light. However, tendencies of the grating depth and the reflectance when changing the filling factor are almost consistent with those of Table 1.

In other words, in the case where the used wavelength λ is 780 nm, it is also possible to reduce the reflectance when the filling factor is 0.6–0.8 as in the case of Table 1. Thus, it is possible to achieve the λ/8 plate which can be easily manufactured.

Therefore, irrespective of the used wavelengths, the preferable dimension of the polarization phase difference plate 5 is the case where the filling factor is 0.6–0.8 when Λ=400 nm.

Figure 14:
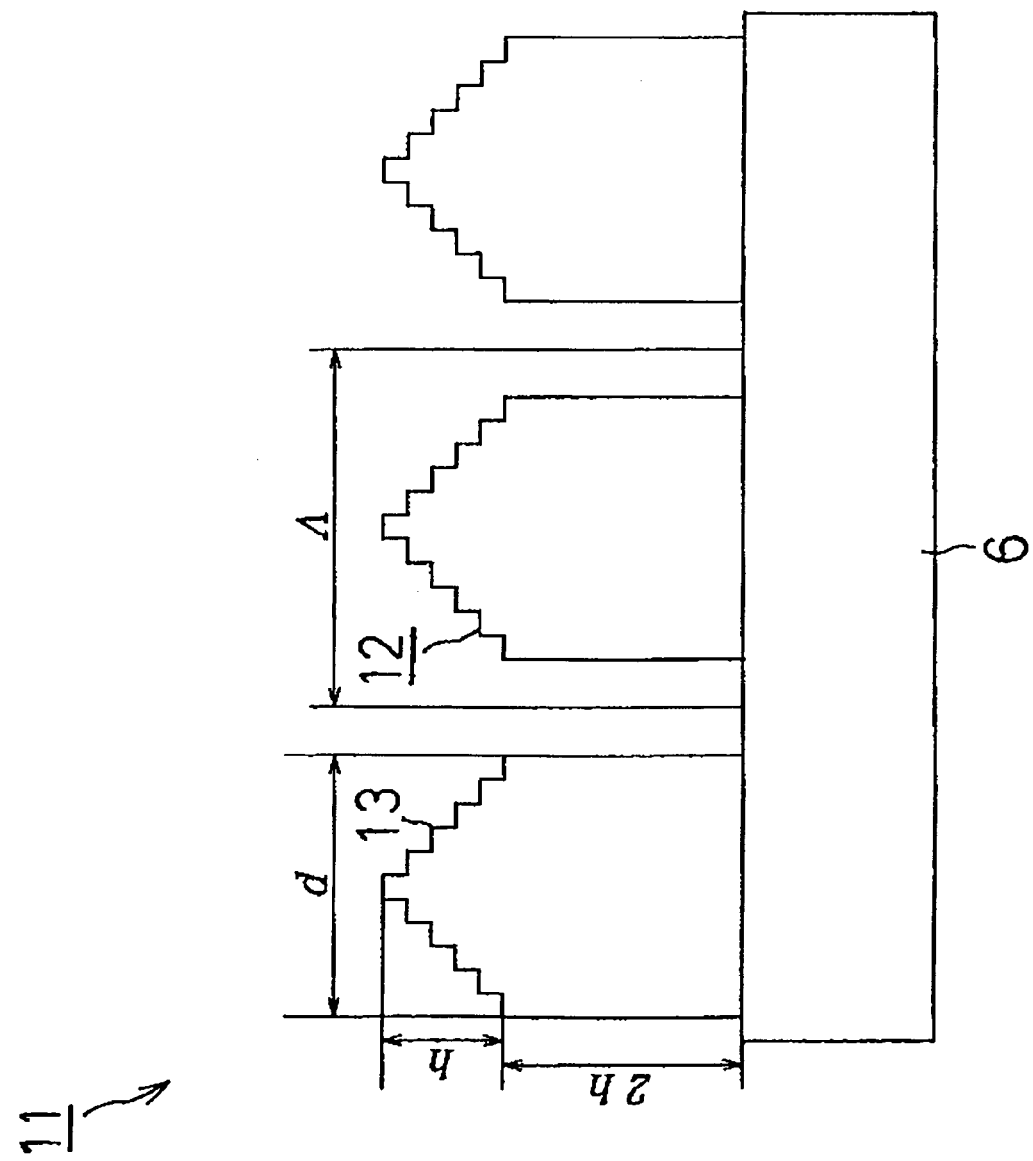
FIG. 14 is an illustration for showing an example of the polarization phase difference plate which does not fulfill the structure of the present invention.

Meanwhile, in the polarization phase difference plate 11 shown in FIG. 14, only the vicinity of the top of the convex part 13 is formed in a taper shape while the diffraction grating 12 with structural birefringence is in a lamellar shape rectangular).

Figure 15:
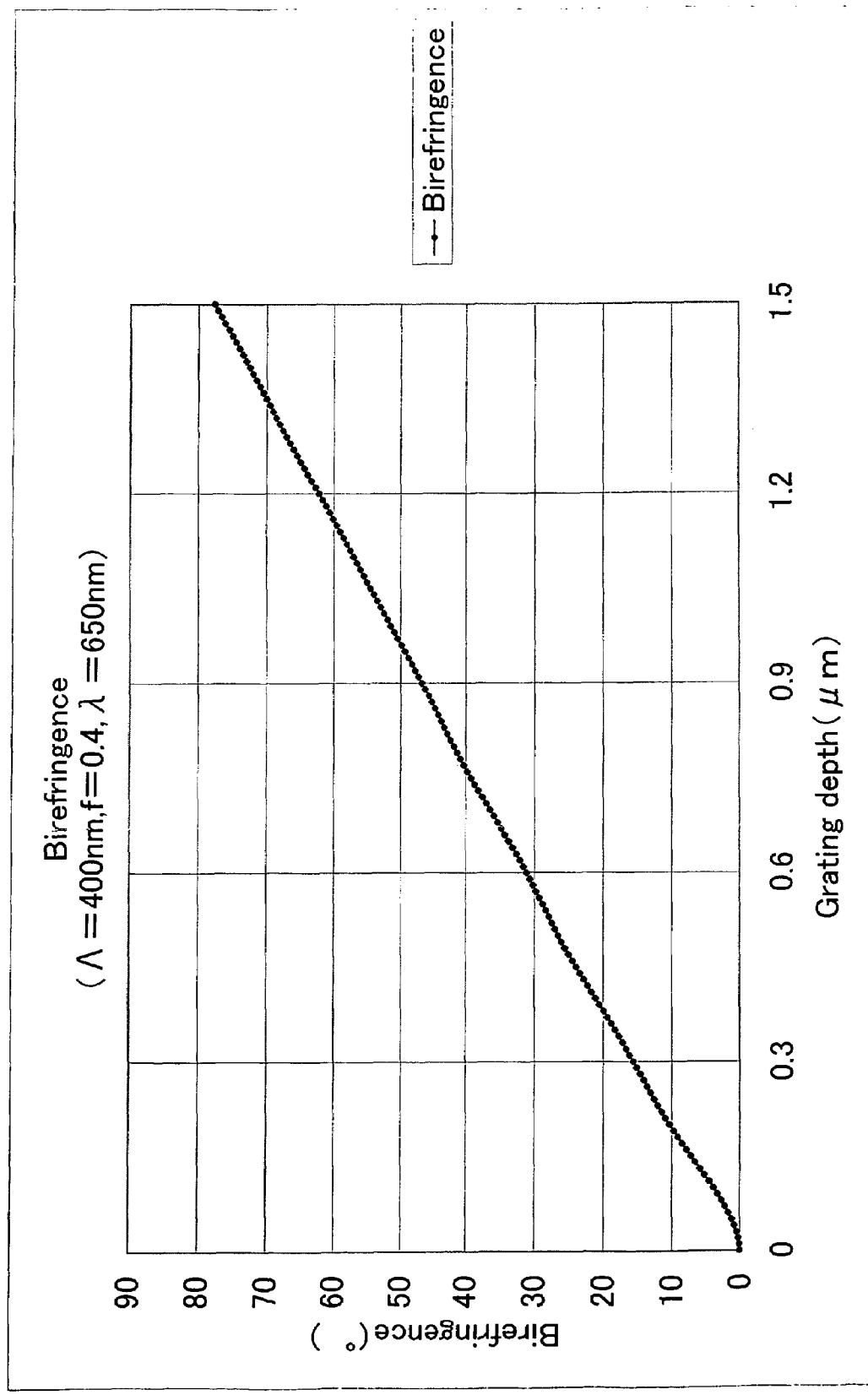
FIG. 15 is a graph for showing the relation between the grating depth and the total amount of the birefringence in the polarization phase difference plate shown in FIG. 14.
Figure 16:
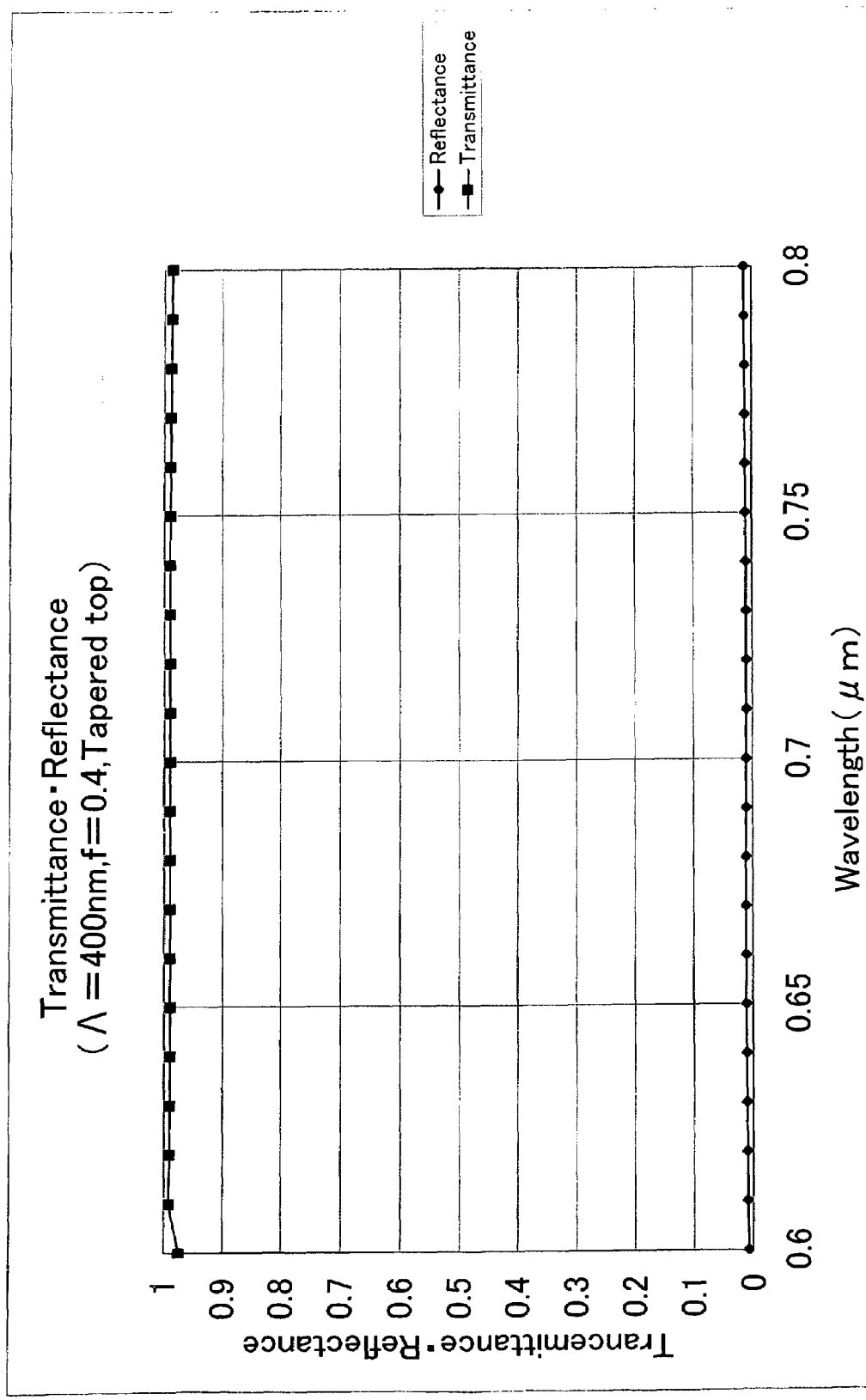
FIG. 16 is a graph for showing wavelength dependency of the transmittance/reflectance under the same conditions as those of FIG. 15.

Like the diffraction grating 7 described above, such diffraction grating 12 of the polarization phase difference plate 11 has the properties shown in FIG. 15 and FIG. 16 when the used wavelength λ is 650 nm, the period Λ is 400 nm, and the filling factor f of the rectangular part is 0.4, on condition that the period of the diffraction grating 12 is Λ, the width dimension of the convex part 13 is d, the height of the rectangular part of the convex part 13 is 2h, the height of the tapered part is h, and the tapered part is approximated in five stages.

FIG. 15 is a graph similar to that of FIG. 5 described above, and FIG. 16 is a graph similar to that of FIG. 7 described above.

It can be seen from FIG. 15 that the total amount of the birefringence becomes 45° when the grating depth is 0.87 μm. Further, it can be seen from FIG. 16 that the reflectance at the time when the grating depth is 0.87 μm and the used wavelength λ is 650 nm is 1.1%.

Comparing this to Table 1 mentioned above, it is found to be effective to form the entire part of the convex part 8 in a taper shape as shown in FIG. 3 than forming only the top end of the convex part 13 in a taper shape as shown in FIG. 14 in order to decrease the reflectance sufficiently.

Further, it is also advantageous in terms of the manufacture process because the detachability from the molding die is better with the diffraction grating 7 shown in FIG. 3 than with the diffraction grating 12 as in FIG. 14.

Furthermore, as described above, the embodiment is based on the assumption that the taper shape is formed through the process of transcription from the molding die to a resin. There are various types of known methods as such transcription process, e.g. nano-imprinting, UV imprinting, hot-embossing, injection molding. There has been a report that the diffraction grating shape with the sub-wavelength width can be formed by nano-imprinting and optical-imprinting.

Moreover, in general, it is known that breakdown of the resin is more likely to happen when removed from the molding die as the aspect ratio (corresponds to the filling factor f) becomes higher. Thus, it becomes difficult to manufacture.

The embodiment is extremely advantageous in terms of the manufacture process since the convex part 8 of the diffraction grating 7 is formed in a taper shape to be easily removed and, in addition, the height of the convex part 8 is formed to be as low as possible while considering the reflectance.

As described above, the polarization phase difference plate 5 according to the embodiment comprises the diffraction grating 7 which exhibits low reflectance and is formed in the dimension and shape to have good detachability. Thus, Fresnel reflection can be effectively suppressed and the mass-productivity can be improved. Further, there requires no coating of the antireflection film so that manufacture inferior such as cracks can be prevented.

The present invention is not limited to the above-described embodiment but various modifications are possible as necessary.

What is claimed is:

1. A polarization phase difference plate, comprising:
   a diffraction grating with a constant period having a plurality of convex parts being arranged, which is formed at least on one of surfaces of a substrate in a thickness direction, said polarization phase difference plate being formed to be capable of utilizing structural birefringence of said diffraction grating, wherein:
   cross-sectional shape of said convex part is formed in a taper shape from a bottom part thereof towards a top part;
   a flat part is formed at least between said convex parts being adjacent to each other;
   said period of said diffraction grating is formed in a size that is equal to or smaller than a wavelength of light to be used;
   said substrate and said diffraction grating are formed by a same substance; and
   said bottom part of said convex part in a period direction of said diffraction grating is formed to have a dimension that is 0.7–0.8 times said period of said diffraction grating.

2. The polarization phase difference plate according to claim 1, wherein:
   said period of said diffraction grating is formed in a size that is two thirds of a wavelength of light to be used or smaller.

3. The polarization phase difference plate according to claim 1, wherein said cross-sectional shape of said convex part is formed in a triangular shape.

4. The polarization phase difference plate according to claim 1, wherein:
 said substrate and said diffraction grating are formed by a resin material; and
 said period of said diffraction grating is 400 nm.

5. The polarization phase difference plate according to claim 1, 2, 3 or 4, wherein said diffraction grating is formed on both surfaces of said substrate in a thickness direction.

6. The polarization phase difference plate according to claim 5, wherein a total amount of birefringence of each of said two diffraction gratings formed on said both surfaces of said substrate in said thickness direction is set as $\lambda/8$ (45°) for light with a wavelength of $\lambda$, respectively, so that said polarization phase difference plate functions as a $\lambda/4$ plate as a whole.

* * * * *